(12) United States Patent
Kumar et al.

(10) Patent No.: US 10,967,351 B2
(45) Date of Patent: Apr. 6, 2021

(54) FLUID CATALYTIC CRACKING PROCESS

(71) Applicant: Hindustan Petroleum Corporation Limited., Mumbai (IN)

(72) Inventors: Pramod Kumar, Bengaluru (IN); Hrishikesh Shriram Shidhaye, Bengaluru (IN); Peddy Vendata Chalapathi Rao, Bengaluru (IN); Sri Ganesh Gandham, Bengaluru (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 0 days.

(21) Appl. No.: 16/617,632

(22) PCT Filed: May 28, 2018

(86) PCT No.: PCT/IN2018/050338
§ 371 (c)(1),
(2) Date: Nov. 27, 2019

(87) PCT Pub. No.: WO2018/220643
PCT Pub. Date: Dec. 6, 2018

(65) Prior Publication Data
US 2020/0171453 A1 Jun. 4, 2020

(30) Foreign Application Priority Data
May 28, 2017 (IN) .............................. 201721015215

(51) Int. Cl.
| | | |
|---|---|---|
| *C10G 51/06* | (2006.01) | |
| *B01J 8/26* | (2006.01) | |
| *B01J 8/28* | (2006.01) | |
| *B01D 3/14* | (2006.01) | |
| *B01J 8/18* | (2006.01) | |
| *C10G 55/06* | (2006.01) | |

(52) U.S. Cl.
CPC ................ *B01J 8/28* (2013.01); *B01D 3/143* (2013.01); *B01J 8/1827* (2013.01); *B01J 8/1872* (2013.01); *C10G 55/06* (2013.01); *B01J 2208/00752* (2013.01); *B01J 2208/00893* (2013.01); *C10G 2300/1044* (2013.01); *C10G 2300/202* (2013.01); *C10G 2300/207* (2013.01); *C10G 2300/30* (2013.01); *C10G 2300/308* (2013.01); *C10G 2300/4006* (2013.01); *C10G 2300/70* (2013.01)

(58) Field of Classification Search
CPC ................ C10G 51/06; C10G 2400/20; C10G 2400/30; B01J 8/26
See application file for complete search history.

(56) References Cited

U.S. PATENT DOCUMENTS

| | | | |
|---|---|---|---|
| 3,071,540 A | 1/1963 | McMahon et al. | |
| 4,276,150 A | 6/1981 | McHenry, Jr. | |
| 5,314,610 A * | 5/1994 | Gartside ................ | C10G 11/18 208/113 |
| 7,029,571 B1 | 4/2006 | Bhattacharyya et al. | |
| 8,894,840 B2 | 11/2014 | Leonard et al. | |
| 9,452,404 B2 * | 9/2016 | Marri ..................... | B01J 8/0055 |
| 2003/0019789 A1 | 1/2003 | Kwak | |

OTHER PUBLICATIONS

International Search Report and Written Opinion for Application No. PCT/IN2018/050338, dated Oct. 19, 2018.

\* cited by examiner

*Primary Examiner* — Randy Boyer
(74) *Attorney, Agent, or Firm* — Marshall, Gerstein & Borun LLP

(57) ABSTRACT

A fluid catalytic cracking unit (FCCU) for production of petrochemical feedstock fractions comprises a first reactor to receive a stream of desalinated crude oil and produce a first cracked product stream; a second reactor to receive a stream of light cracked naphtha (LCN) and produce a second cracked product stream; a third reactor to receive a bottom stream and produce a third cracked product stream; and a fractionating column and gas concentration section to separate components of the first cracked product stream, the second cracked product stream, and the third cracked product stream to produce, upon further fractionation, Ethylene, Propylene, Butylene, Benzene, Toluene and Xylene as the petrochemical feedstock fractions.

19 Claims, 1 Drawing Sheet

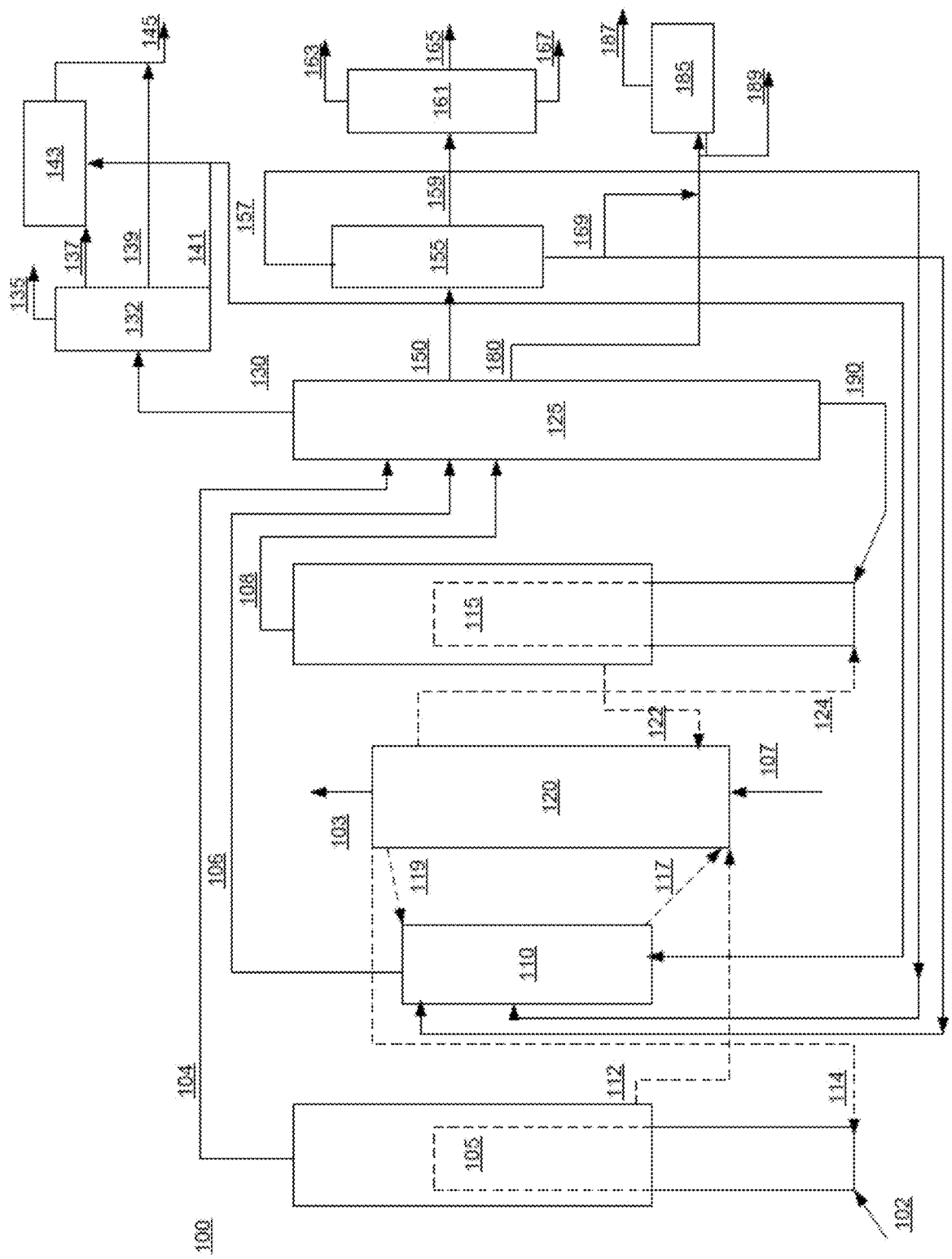

FLUID CATALYTIC CRACKING PROCESS

TECHNICAL FIELD

The present subject matter relates to fluid catalytic cracking process and, in particular, to a process for producing petrochemical feedstock.

BACKGROUND

Different hydrocarbon products are obtained from crude oils by the process of refining. The existing refining process involves multiple steps and multiple units. Crude oil is heated using heat exchangers and furnace. It is then distilled in atmospheric distillation column to obtain naphtha, kerosene and diesel fractions, and remaining crude oil.

The Naphtha fraction is typically divided into two streams: Light Naphtha and Heavy Naphtha. Heavy Naphtha has little value and is typically blended with Diesel. Light Naphtha has low Research Octane Number (RON) value. Isomerization and catalytic reforming processes are employed in the refineries to increase the RON value of Light Naphtha. The treated Light Naphtha, known as isomerate and reformate respectively, is blended in the Motor Spirit (MS). On several occasions, Light Naphtha is in excess quantities and refineries sell it at cheaper price than Motor Spirit (MS). Similarly, while a fraction of Kerosene is treated in Mercaptan Oxidization (MerOx) units to produce Aviation Turbine Fuel (ATF), a high value product, the remaining fraction of kerosene is typically sold at relatively cheap price due to insufficient demand for ATF and/or government regulations.

The remaining crude oil, termed as Reduced Crude Oil (RCO) or Atmospheric Tower Bottoms (ATB), is typically heated in a furnace and distilled under vacuum. The fractions obtained are typically called Vacuum Gas Oil (VGO) and Short Residue (SR) or Vacuum Tower Bottoms (VTB). VGO streams are typically upgraded in Fluid Catalytic Cracking unit (FCCU) or Hydrocracking units. FCCU typically produces high octane gasoline and olefin rich LPG. Petrochemical precursors or feedstock, such as Ethylene, Propene and Butylene are obtained from the LPG from FCC unit.

In an existing refinery process as described above multiple units are required for production of final products from crude oil. Each unit requires different heat exchangers, furnaces and product coolers. The design of the units puts limits on the crudes processed in a refinery. A typical refinery has emphasis on production of fuels like MS, ATF and Diesel. Fuel Oil is also produced by refineries using the SR and FCCU bottoms. However, in the present scenario of high demand for petrochemical feedstock, its production from crude oil requires at least 2 distillation units, 1 FCC unit followed by at least 3 more distillation units. Further in the existing refinery process, undesirable low value fuel oil is produced while producing the petrochemical feedstock.

BRIEF DESCRIPTION OF DRAWINGS

The detailed description is described with reference to the accompanying FIGURES. In the FIGURES, the left-most digit(s) of a reference number identifies the FIGURE in which the reference number first appears. The same numbers are used throughout the drawings to reference like features and components.

FIG. 1 illustrates a block diagram of a fluid catalytic cracking unit (FCCU) to perform a fluid catalytic cracking (FCC) process, in accordance with an embodiment of the present subject matter.

DETAILED DESCRIPTION

In an existing refinery process for production of petrochemical feedstock from crude oil multiple units are required. Each unit requires different heat exchangers, furnaces and product coolers. The design of these units puts limits on the crudes processed in a refinery. A typical refinery has emphasis on production of fuels like MS, ATF and Diesel. Fuel Oil is also produced by refineries using the SR and FCCU bottoms. However, in the present scenario of high demand for petrochemical feedstock, its production from crude oil requires at least 2 distillation units, 1 FCC unit followed by at least 3 more distillation units. Further in this process, the refinery produces fuels such as gasoline and diesel, along with certain undesirable low value fuel oils from the SR and FCC bottoms.

The present subject matter describes a fluid catalytic cracking (FCC) process for producing petrochemical feedstock directly from desalinated crude oil. Petrochemical feedstock typically comprises olefins that includes ethylene and propylene, and aromatics that includes benzene, toluene and xylene. The process as per the present subject matter results in significantly reduced steps and units compared to the existing refining process for producing petrochemical feedstock. The process described herein produces no bottoms, kerosene, or low value fuel oils. Also, aromatic solvents such as benzene, toluene and xylene are produced from crude oil.

The fluid catalytic cracking process of the present invention is carried out in a FCCU that includes a three-reactor system. The desalinated crude oil and a regenerated catalyst is injected from the bottom of the first reactor, which is a co-current reactor in one example. The product stream from the first reactor is fractionated in a fractionating column and gas concentration section to produce: a gas fraction, a cracked naphtha fraction, a cycle cut oil, and a bottom stream. The gas fraction is distilled to produce light olefins and the remaining gases are used as fuel gas and LPG. The cracked naphtha fraction is fractionated to produce light cracked naphtha (LCN), middle cracked naphtha (MCN) and heavy cracked naphtha (HCN) streams. MCN stream is fractionated to produce BTX aromatics. In one example, the LCN is sent as feed to a second reactor. In another example, in addition to LCN, HCN, and Butylene (obtained as a part of the light olefins) streams are also cracked in the second reactor. In one example, the second reactor is a counter current type reactor. The second reactor may have three separate feed injection locations at varying heights, a top location, middle location and bottom location. The HCN stream is injected from a top location, the LCN stream from a middle location and the Butylene stream from a bottom location of the second reactor and all the three streams flow in an upward direction in the reactor. The regenerated catalyst is injected from the top of the second reactor and flows in a downward direction, in one example. The injection of HCN from the top location ensures that the regenerated catalyst which is injected from top of the reactor first comes in contact with the HCN stream forming a coke layer on the regenerated catalyst surface, this coke layer aids in subsequent efficient cracking of LCN and Butylene streams injected from the middle and bottom locations respectively, when all three streams are fed to the second reactor.

The bottom stream is cracked in a third reactor. The bottom stream and the regenerated catalyst are injected from the bottom of the third reactor, which is a co-current type reactor in one example. The product streams from the second and third reactor are fractionated in the fractionating column and gas concentration section, similar to the product stream from the first reactor, to produce gas fraction, cracked naphtha fraction, a cycle cut oil and bottom stream. These are further processed to produce light olefins and aromatics as discussed above.

Since the bottom stream is not drawn out from the process, a closed loop fluid catalytic cracking process is followed with reference to the bottom stream. This ensures that low value intermediate products or bottoms products are not produced and directly high value petrochemical feedstock is produced.

The present subject matter is further described with reference to FIG. 1. It should be noted that the description and FIGURES merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a fluid catalytic cracking unit (FCCU) (100) to perform the fluid catalytic cracking process, in accordance with an embodiment of the present subject matter. The FCCU (100) includes a first reactor (105), a second reactor (110), a third reactor (115), a regenerator (120), and a fractionating column and gas concentrator section (125) in one example. Additionally, FCCU (100) may include one or more of a first fractionator column (132), a second fractionator column (155), a third fractionator column (161), a hydrotreating unit (185) and a metathesis unit (143). Although, the fluid catalytic cracking unit (100) may include various other intermediate sub-units that may be utilized during the crude oil processing, however, for the sake of brevity and not as a limitation, only the aforementioned sub-units are described and shown in the FIG. 1.

A stream of desalinated crude oil (102) and a first stream (114) of a regenerated catalyst, are injected into the first reactor (105) of the FCCU (100), to obtain a first cracked product stream (104). The desalinated crude oil (102) flows co-currently with the first stream (114) of the regenerated catalyst in the first reactor (105). In one example, in the first reactor, the ratio of catalyst to oil is predetermined in a range of 5:1 to 25:1 and is operated at a predetermined temperature in a range of 550-600° C.

The first cracked product stream (104) is fractionated in a fractionating column and gas concentration section (125) to obtain a gas fraction (130), a cracked naphtha stream (150), a cycle oil cut (180) and a bottom stream (190). The gas fraction (130) is distilled in the first fractionator column (132) to separate ethylene (137), propylene (139), Butylene (141) and the remaining gases (135) that can be used as fuel gas and LPG. In one example, the ethylene (137) and Butylene (141) may be made to undergo metathesis in a metathesis unit (143) to produce propylene (145). In another example, a part or all of the Butylene (141) may be used for further reaction in the FCCU (100). Optionally, hydrogen is recovered from the remaining gases (135) for use in hydrotreating unit (185).

The cracked naphtha stream (150) is fractionated in the second fractionator column (155) to separate into LCN (157), MCN (159), and HCN (169) streams. The boiling point of LCN (157) may be in a range of 35-70° C., boiling point of MCN (159) may be in a range of 70-150° C. and boiling point of HCN (169) may be in a range of 150-190° C. Although the boiling point ranges are found to be non-overlapping, in a few instances, the boiling point ranges of LCN (157), MCN (159) and HCN (169) may overlap. For example, boiling point of LCN (157) may be in a range of 25-100° C., boiling point of MCN (159) may be in a range of 50-170° C., and boiling point of HCN (169) may be in a range of 120-200° C.

The MCN (159) stream is further fractionated in a third fractionator column (161) to obtain BTX aromatics, i.e. Benzene (163), Toluene (165) and Xylene (167). Optionally, solvent extraction is used to concentrate aromatic compounds in the MCN (159) prior to fractionation of MCN (159) into BTX aromatics. In one example, the HCN stream (169) is blended with cycle cut oil (180) to produce an aromatic solvent (189). Optionally, the blend of cycle cut oil (180) and HCN (169) stream is hydrotreated in a hydrotreater unit (185) to remove Sulphur and produce diesel (187). In another example, a part or all of the HCN stream (169) may be used for further reaction in the FCCU (100).

Accordingly, the LCN (157), and optionally one or both of the HCN (169) and the Butylene (141) streams, either in full or partially, are cracked with a second stream (119) of the regenerated catalyst, in a second reactor (110) of the FCCU (100), to obtain a second cracked product stream (106). The second reactor (110) may have three separate feed injection locations: a top location, middle location, and bottom location. In the second reactor (110), the HCN stream (169) is injected from the top location, the LCN stream (157) from the middle location, and the Butylene (141) stream from the bottom location of the second reactor (110). Further, in the second reactor (110), the HCN (169), LCN (157) and Butylene (141) streams flow in an upward direction i.e. counter-current to the second stream (119) of the regenerated catalyst, which flows in a downward direction. It will be understood that depending on the feed sent to the second reactor (110), the locations of the feed injection may vary. For example, if only LCN (157) is fed to the second reactor (110), it may have fuel injection provision only at the middle location. In one example, in the second reactor (110), the ratio of catalyst to oil is predetermined in a range of 10:1 to 50:1 and is operated at a predetermined temperature in a range of 600-650° C.

The bottom stream (190) is cracked with a third stream (124) of the regenerated catalyst, in a third reactor (115) of the FCCU (100), to obtain a third cracked product stream (108). In the third reactor (115) the bottom stream (190) flows co-current with the third stream (124) of the regenerated catalyst but at a higher weight hourly space velocity (WHSV) than the first reactor (105). In the third reactor (115), catalyst is in turbulent regime of fluidization, with catalyst to oil ratio predetermined in a range of 3:1 to 10:1, and operated at a predetermined temperature in a range of 550-580° C.

The second cracked product stream (106) and the third cracked product stream (108) are fractionated in the fractionating column and gas concentration section (125). Similar to the first cracked product stream (104), the fractionation of the second and the third cracked product streams (106, 108) also result in a gas fraction (130), a cracked naphtha stream (150), a cycle oil cut (180) and a bottom stream (190). These are separated in the fractionating column and gas concentration section (125) and the products are processed as discussed above with reference to the products from the first cracked product stream (104).

Thus, it will be understood that the product streams of all three reactors (105, 110, 115) are fed to the fractionating column and gas concentration section (125) to obtain the gas fraction (130), the cracked naphtha stream (150), the cycle oil cut (180) and the bottom stream (190). In one example, all of the bottom stream (190) is recycled back to the third reactor (115), thereby resulting in no production of bottom streams from the FCCU (100). Further, the LCN (157) obtained from the cracked naphtha stream (150) is recycled to the second reactor (110), while the HCN (169) may also be optionally recycled to the second reactor (110). Similarly, the butylene (141) obtained from the gas fraction (130) may also be optionally recycled to the second reactor (110).

The FCCU (100) as disclosed herein operates at a predetermined pressure in a range of 0.01 kg/cm$^2$-2 kg/cm$^2$. The catalyst used in the FCC process may be selected from Y-zeolite, Pentasil, and combinations thereof. The spent catalyst from the three reactors (105), (110) and (115) is sent as a first stream (112), second stream (117), and third stream (122), to the regenerator (120) for regeneration of the spent catalyst. The coke produced on spent catalyst is burnt off using air (107) in the regenerator (120) to release combustion gases (103). The regenerated catalyst is then sent from the regenerator (120) as the first regenerated stream (114), second regenerated stream (119) and third regenerated stream (124), to the first reactor (105), the second reactor (110), and the third reactor (115) respectively. In one example, the spent catalyst in first (112) and third (122) streams may be stripped using steam to remove the adsorbed hydrocarbons prior to regeneration, while no stripping steam may be used for the spent catalyst in the second (117) stream.

The present subject matter thus provides a fluid catalytic cracking unit and process for production of petrochemical feedstock such as light olefins and aromatics directly from the desalinated crude oil. The unit and process described in present subject matter results in significantly reduced steps and sub-units as compared with the existing refinery processes and units for production of petrochemical feedstock. The process described herein results in no production of bottoms, low value fuel oils, and kerosene. The process described herein produces aromatic solvents from crude oil in less steps than existing refinery process. Also, the process described herein produces aromatic solvents such as benzene, toluene and xylene from crude oil.

Accordingly, a method for fluid catalytic cracking unit of desalinated crude oil for production of petrochemical feedstock fractions is also provided by the present subject matter. The method includes reacting a stream of desalinated crude oil (102) with a first stream (114) of a regenerated catalyst in a first reactor (105) to produce a first cracked product stream (104). Further, the method includes reacting stream of light cracked naphtha (LCN) (157) with a second stream (119) of the regenerated catalyst in a second reactor (110) to produce a second cracked product stream (106). Further, the method includes reacting a bottom stream (190) and a third stream (124) of the regenerated catalyst in a third reactor (115) to obtain a third cracked product stream (108). Further, the method includes separating components of the first cracked product stream (104), the second cracked product stream (106), and the third cracked product stream (108) in a fractionating column and gas concentration section (125) to produce a gas fraction (130), a cracked naphtha stream (150), a cycle cut oil (180), and the bottom stream (190), wherein the LCN (157) received by the second reactor (110) is obtained from the cracked naphtha stream (150), and wherein the gas fraction (130) and the cracked naphtha stream (150) are further fractionated to obtain Ethylene (137), Propylene (139), the Butylene (141), Benzene (163), Toluene (165) and Xylene (167) as the petrochemical feedstock fractions.

In one example, the first and third reactors (105, 115) are operated as co-current reactors and the second reactor (110) is operated as a counter current reactor. For example, the third reactor (115) may be operated at a higher weight hourly space velocity (WHSV) than the first reactor (105) and in turbulent regime of fluidization.

In one example, the HCN (169) is introduced at a top injection location in the second reactor (110), the LCN (157) is introduced at a middle injection location in the second reactor (110), and the Butylene (141) are introduced at a bottom injection location in the second reactor (110).

In one example, ratio of catalyst to oil in the first reactor (105) is in a range of 5:1 to 25:1 and operating temperature is in a range of 550-600° C.

In one example, ratio of catalyst to oil in the second reactor (110) is in a range of 10:1 to 50:1 and operating temperature is in a range of 600-650° C.

In one example, ratio of catalyst to oil in the third reactor (115) is in a range of 3:1 to 10:1, and operating temperature is in a range of 550-580° C.

In one implementation, all the bottom stream (190) from the fractionating column and gas concentration section (125) is sent to the third reactor (115) to generate the third cracked product stream (108) and no bottom product is obtained as a product from the FCCU (100).

In one example, in addition to the LCN (157), heavy cracked naphtha (HCN) (169), and Butylene (141) are also fed to the second reactor (110), wherein the HCN (169) received by the second reactor (110) is obtained from the cracked naphtha stream (150) and the Butylene (141) received by the second reactor (110) is obtained from the gas fraction (130). In one example, the HCN (169) recycled back to the second reactor (110) is a part of the HCN (169) produced from the cracked naphtha stream (150). In another example, all of the HCN (169) produced from the cracked naphtha stream (150) may be recycled to the second reactor (110). Similarly, in one example, the Butylene (141) recycled back to the second reactor (110) is a part of the Butylene (141) produced from the gas fraction (130). In another example, all of the Butylene (141) produced from the gas fraction (130) may be recycled to the second reactor (110).

The principles of the present subject matter will be further illustrated by the following examples. It is to be understood that the examples are merely for illustration and are not meant to be limiting in anyway.

Example 1

This example illustrates the yield from cracking of low Sulphur crude oil. The experiments were conducted in fixed fluidized bed reactor. The catalyst was deactivated at 815° C. for 10 hours. In this example, LCN and bottoms are recycle streams. The properties of feed are given in Table 1.

TABLE 1

| Property | unit | Crude oil | LCN | Bottoms |
| --- | --- | --- | --- | --- |
| Density | g/cc | 0.847 | 0.68 | 1.01 |
| Sulphur | wt. % | 0.124 | <0.01 | 0.068 |

The operating conditions and yields are given in Table 2. In this example, only the LCN stream was recycled to the second reactor, while the butylene was taken out as product and the HCN was hydrotreated. However, it will be understood that in other examples, as discussed earlier, the HCN and butylene may also be recycled to the second reactor in part or fully. Fuel gas comprises of Hydrogen, methane and ethane. LPG comprises of propane, butane and isobutene.

The percentage weight of yield provided in table 2 for a reactor is with respect to weight of respective feed.

TABLE 2

| Parameter | unit | Reactor-1 Crude oil | Reactor-2 Feed LCN | Reactor-3 Bottoms |
|---|---|---|---|---|
| Reactor temperature | ° C. | 565 | 600 | 565 |
| Cat/oil | wt./wt. | 14:1 | 14:1 | 8:1 |
| Yields | | | | |
| Coke | wt. % | 4.2 | 2.9 | 17.0 |
| Fuel gas | wt. % | 2.1 | 3.0 | 2.5 |
| Ethylene | wt. % | 2.6 | 11.9 | 2.2 |
| LPG | wt. % | 11.3 | 7.3 | 3.8 |
| Propylene | wt. % | 11.8 | 18.5 | 8.6 |
| Butylene | wt. % | 6.9 | 11.8 | 6.3 |
| LCN (C5-90° C.) | wt. % | 15.8 | 44.6 | 5.7 |
| MCN (90-140° C.) | wt. % | 14.4 | 0.0 | 4.0 |
| HCN (140-180° C.) | wt. % | 13.3 | 0.0 | 2.8 |
| LCO (180-343° C.) | wt. % | 15.4 | 0.0 | 15.2 |
| Bottoms (343° C.+) | wt. % | 2.2 | 0.0 | 31.9 |

Yield of petrochemical feedstock is given in Table 3. The yield in Table 3 is provided as a percentage weight of crude oil processed in the FCCU. It will be understood that the remaining yield corresponds to other products, such as cycle cut oil, LPG, LCO, etc. for which yields are not shown in the table.

TABLE 3

| Product | unit | Yield |
|---|---|---|
| Ethylene | wt. % | 5.6 |
| Propylene | wt. % | 16.6 |
| Butylene | wt. % | 10.0 |
| Benzene | wt. % | 0.5 |
| Toluene | wt. % | 3.8 |
| Xylene | wt. % | 6.6 |

Thus, high yields of petrochemical feedstock can be obtained directly from crude oil without production of low value intermediate and bottoms as products.

While illustrative system and methods as described herein, embodying various characteristics of the present invention are shown, it will be understood by those skilled in the art, that the invention is not limited to these embodiments. Modifications may be made by those skilled in the art, particularly in light of the foregoing teachings. It will also be appreciated and understood that modifications may be made without departing from the true scope of the present invention. The description is thus to be regarded as illustrative instead of restrictive on the present invention.

We claim:

1. A fluid catalytic cracking unit (FCCU) for production of petrochemical feedstock fractions, the FCCU comprising:
    a first reactor to receive a stream of desalinated crude oil and a first stream of a regenerated catalyst and produce a first cracked product stream;
    a second reactor to receive a stream of light cracked naphtha (LCN) and a second stream of the regenerated catalyst to produce a second cracked product stream;
    a third reactor to receive a bottom stream and a third stream of the regenerated catalyst to obtain a third cracked product stream; and
    a fractionating column and gas concentration section to separate components of the first cracked product stream, the second cracked product stream and the third cracked product stream to produce a gas fraction, a cracked naphtha stream, a cycle cut oil stream, and the bottom stream,
    wherein the LCN received by the second reactor is obtained from the cracked naphtha stream, and
    wherein the gas fraction and the cracked naphtha stream are further fractionated to obtain Ethylene, Propylene, Butylene, Benzene, Toluene and Xylene as the petrochemical feedstock fractions.

2. The FCCU as claimed in claim 1, wherein the first and third reactors are operated as co-current reactors and the second reactor is operated as a counter current reactor.

3. The FCCU as claimed in claim 2, wherein the third reactor is operated at a higher weight hourly space velocity (WHSV) than the first reactor and in turbulent regime of fluidization.

4. The FCCU as claimed in claim 1, wherein the second reactor comprises three feed injection locations at varying heights, wherein the HCN is introduced at a top injection location, the LCN is introduced at a middle injection location, and the Butylene is introduced at a bottom injection location into the second reactor.

5. The FCCU as claimed in claim 1, wherein ratio of catalyst to oil in the first reactor (105) is in a range of 5:1 to 25:1 and operating temperature is in a range of 550-600° C.

6. The FCCU as claimed in claim 1, wherein ratio of catalyst to oil in the second reactor is in a range of 10:1 to 50:1 and operating temperature is in a range of 600-650° C.

7. The FCCU as claimed in claim 1, wherein ratio of catalyst to oil in the third reactor is in a range of 3:1 to 10:1, and operating temperature is in a range of 550-580° C.

8. The FCCU as claimed in claim 1, wherein all the bottom stream from the fractionating column and gas concentration section is sent to the third reactor to generate the third cracked product stream and no bottom product is obtained as a product from the FCCU.

9. The FCCU as claimed in claim 1, comprising a regenerator to regenerate spent catalyst in spent catalyst streams received from the first, second, and third reactors, and provide the first, second, and third streams of regenerated catalyst.

10. The FCCU as claimed in claim 1, wherein heavy cracked naphtha (HCN) and Butylene are fed to the second reactor in addition to the LCN, wherein the HCN received by the second reactor is obtained from the cracked naphtha stream and the Butylene received by the second reactor is obtained from the gas fraction.

11. A method for fluid catalytic cracking unit of desalinated crude oil for production of petrochemical feedstock fractions, the method comprising:
    reacting a stream of desalinated crude oil with a first stream of a regenerated catalyst in a first reactor to produce a first cracked product stream;
    reacting a stream of light cracked naphtha (LCN) with a second stream of the regenerated catalyst in a second reactor to produce a second cracked product stream;

reacting a bottom stream and a third stream of the regenerated catalyst in a third reactor to obtain a third cracked product stream; and separating components of the first cracked product stream, the second cracked product stream, and the third cracked product stream in a fractionating column and gas concentration section to produce a gas fraction, a cracked naphtha stream, a cycle cut oil stream, and the bottom stream, wherein the LCN received by the second reactor is obtained from the cracked naphtha stream, and wherein the gas fraction and the cracked naphtha stream are further fractionated to obtain Ethylene, Propylene, Butylene, Benzene, Toluene and Xylene as the petrochemical feedstock fractions.

12. The method as claimed in claim 11, wherein the first and third reactors are operated as co-current reactors and the second reactor is operated as a counter current reactor.

13. The method as claimed in claim 12, wherein the third reactor is operated at a higher weight hourly space velocity (WHSV) than the first reactor and in turbulent regime of fluidization.

14. The method as claimed in claim 11, wherein the HCN is introduced at a top injection location in the second reactor, the LCN is introduced at a middle injection location in the second reactor, and the Butylene are introduced at a bottom injection location in the second reactor.

15. The method as claimed in claim 11, wherein ratio of catalyst to oil in the first reactor is in a range of 5:1 to 25:1 and operating temperature is in a range of 550-600° C.

16. The method as claimed in claim 11, wherein ratio of catalyst to oil in the second reactor is in a range of 10:1 to 50:1 and operating temperature is in a range of 600-650° C.

17. The method as claimed in claim 11, wherein ratio of catalyst to oil in the third reactor {115} is in a range of 3:1 to 10:1, and operating temperature is in a range of 550-580° C.

18. The method as claimed in claim 11, wherein all the bottom stream from the fractionating column and gas concentration section is sent to the third reactor to generate the third cracked product stream and no bottom product is obtained as a product from the FCCU.

19. The method as claimed in claim 11, comprising reacting heavy cracked naphtha (HCN) and Butylene with the second stream of the regenerated catalyst in the second reactor in addition to the LCN, wherein the HCN received by the second reactor is obtained from the cracked naphtha stream and the Butylene received by the second reactor is obtained from the gas fraction.

* * * * *